United States Patent
Kijimoto

(10) Patent No.: US 12,207,764 B2
(45) Date of Patent: Jan. 28, 2025

(54) FRYER

(71) Applicant: PALOMA RHEEM HOLDINGS CO., LTD., Tokyo (JP)

(72) Inventor: Hideki Kijimoto, Aichi (JP)

(73) Assignee: PALOMA RHEEM HOLDINGS CO., LTD., Tokyo (JP)

( * ) Notice: Subject to any disclaimer, the term of this patent is extended or adjusted under 35 U.S.C. 154(b) by 774 days.

(21) Appl. No.: 16/507,411

(22) Filed: Jul. 10, 2019

(65) Prior Publication Data
US 2020/0037822 A1     Feb. 6, 2020

(30) Foreign Application Priority Data

Aug. 6, 2018 (JP) .................................. 2018-147880
Mar. 14, 2019 (JP) .................................. 2019-047465

(51) Int. Cl.
A47J 37/12     (2006.01)

(52) U.S. Cl.
CPC ........ *A47J 37/1266* (2013.01); *A47J 37/1242* (2013.01); *A47J 37/1257* (2013.01)

(58) Field of Classification Search
None
See application file for complete search history.

(56) References Cited

U.S. PATENT DOCUMENTS

| | | | | |
|---|---|---|---|---|
| 6,058,245 | A * | 5/2000 | McNamara, Jr. | ....... A47J 37/12 392/308 |
| 8,070,943 | B2 * | 12/2011 | Allen, Jr. et al. | ....... A47J 37/12 210/167.28 |
| 2002/0174778 | A1 * | 11/2002 | Petrusha | .................. A47J 37/12 99/336 |
| 2004/0058043 | A1 * | 3/2004 | More | ..................... A47J 37/12 426/438 |

(Continued)

FOREIGN PATENT DOCUMENTS

| | | | | |
|---|---|---|---|---|
| CN | 102197961 A | * | 9/2011 | .......... A47J 37/1252 |
| CN | 106574907 A | * | 4/2017 | ............. G01N 33/03 |
| JP | S6315928 A | | 1/1988 | |

(Continued)

OTHER PUBLICATIONS

Machine translation of CN 102197961 A performed on Feb. 14, 2022, Kojimoto et al. (Year: 2011).*

(Continued)

*Primary Examiner* — Dana Ross
*Assistant Examiner* — Kevin Guanhua Wen
(74) *Attorney, Agent, or Firm* — Maier & Maier, PLLC

(57) ABSTRACT

A fryer includes a controller that can perform a first cooking mode and second cooking mode. In the first cooking mode, an object to be cooked is cooked by controlling the pulse combustor with a prescribed first heat quantity when the cooking oil contained in the oil bath is in a prescribed first oil amount, and the object to be cooked is in a prescribed first rated amount. In the second cooking mode, an object to (Continued)

be cooked is cooked by controlling the pulse combustor with a prescribed second heat quantity larger than the first heat quantity when the cooking oil is a prescribed second oil amount larger than the first oil amount, and the object to be cooked is in a prescribed second rated amount larger than the first rated amount.

6 Claims, 4 Drawing Sheets

(56) References Cited

U.S. PATENT DOCUMENTS

| | | | |
|---|---|---|---|
| 2009/0084273 A1* | 4/2009 | Lackman et al. | A47J 37/12 99/408 |
| 2011/0256285 A1* | 10/2011 | De' Longhi | A47J 37/0641 426/438 |

FOREIGN PATENT DOCUMENTS

| | | |
|---|---|---|
| JP | 3011711 B1 | 2/2000 |
| JP | 2000166774 A | 6/2000 |
| JP | 2010250190 A | 11/2010 |
| JP | 2011516173 A | 5/2011 |
| JP | 5340962 B2 | 11/2013 |
| JP | 5433456 B2 * | 3/2014 ........... A47J 37/1223 |
| WO | WO 2007116882 A1 * | 10/2007 ........... A47J 37/1223 |
| WO | WO 2013039007 A1 * | 3/2013 ........... A47J 37/1266 |
| WO | WO 2013148425 A2 * | 10/2013 ............. G01F 23/22 |

OTHER PUBLICATIONS

Machine translation of WO 2013039007 A1 performed on Jul. 8, 2022, Yamada (Year: 2013).*
Machine translation of CN 106574907 A performed on Jun. 2, 2023, Mcghee et al. (Year: 2017).*
Machine translation performed on JP 5433456 B2, Kimura, Sep. 18, 2023 (Year: 2014).*
Machine translation performed on WO 2007116882 A1, Kimura et al., Sep. 18, 2023 (Year: 2007).*
Machine translation of JP 5433456 B2 performed on Apr. 16, 2024, Kimura (Year: 2014).*
Office Action issued on Jan. 24, 2023, in corresponding Japanese Application No. 2019047465, 8 pages.
Office Action issued on Jun. 20, 2023, in corresponding Japanese Application No. 2019-047465, 8 pages.

* cited by examiner

FRYER

CROSS-REFERENCE TO RELATED APPLICATIONS

This application claims the benefit of Japanese Patent Application Numbers 2018-147880 and 2019-047465 both filed on Aug. 6, 2018, the entirety of which is incorporated by reference.

FIELD

The present invention relates to a fryer for business use that heats and cooks food materials put in an oil bath after heating cooking oil in the oil bath.

BACKGROUND

A fryer heats and cooks food materials put in an oil bath after heating cooking oil contained in the oil bath up to a prescribed cooking temperature with a heating means such as a burner and a heating body.

As the heating time is made longer and the heating frequency is increased, an amount of impurities accumulated in the cooking oil increases and the cooking oil deteriorates, causing degradation of the cooking quality. In addition, the amount of the cooking oil is reduced since the cooking oil is absorbed in the food materials. Accordingly, when the fryer is used, it is necessary to filter cooking oil and supply new cooking oil (adding oil) periodically depending on the cooking time and the cooking frequency etc. For example, Japanese Patent No. 5340962 discloses a fryer wherein a basket including potatoes in a rated amount (680 g) is put into an oil bath in which a small amount of cooking oil of about 30-40 lb is stored to cook the potatoes, and wherein reduced cooking oil due to the cooking is appropriately refilled. In the above-mentioned fryer, while microstains from the cooking oil in the oil bath are taken outside along with the potatoes, the oil bath is appropriately refilled with new cooking oil. As a result, the stain of the cooking oil in the oil bath is suppressed, and thus a span for exchanging the cooking oil can be made longer.

SUMMARY

However, in the above-mentioned fryer, since the quantity of heat contained in the whole cooking oil in the oil bath is small, the temperature of the cooking oil is below an appropriate range of cooking temperature when potatoes in a rated amount is continuously cooked and potatoes in an amount of more than the rated amount is put into the fryer, and thus the cooking quality cannot be guaranteed. Accordingly, even during the busiest periods such as the lunchtime when it is necessary to cook a large amount of potatoes quickly, cooking must be interrupted until the temperature of the cooking oil rises.

The present invention has been made to dissolve the above problem and has an object to provide a fryer to cook a large amount of food materials even during the busiest periods such as the lunchtime while maintaining an advantage in cooking with a small amount of cooking oil (keeping the cooking oil well for a long period).

In order to accomplish the above object, a fryer according to one aspect of the present invention is provided. The fryer includes an oil bath, a heater, and a controller. The oil bath contains cooking oil, the heater is provided in the oil bath to heat the cooking oil, and the controller controls the heater.

In the fryer, the controller can perform a first cooking mode and a second cooking mode. In a first cooking mode, an object to be cooked is cooked by controlling the heater with a prescribed first heat quantity when the cooking oil contained in the oil bath is in a prescribed first oil amount and the object to be cooked is in a prescribed first rated amount. In the second cooking mode, an object to be cooked is cooked by controlling the heater with a prescribed second heat quantity larger than the first heat quantity when the cooking oil is in a prescribed second oil amount larger than the first oil amount and the object to be cooked is in a prescribed second rated amount larger than the first rated amount.

In order to accomplish the above object, a fryer according to another aspect of the present invention is provided. The fryer includes an oil bath, a heater, and a controller. The oil bath contains cooking oil, a heater is provided in the oil bath to heat the cooking oil, and a controller controls the heater. In the fryer, a first cooking mode and a second cooking mode are performed to cook an object to be cooked. In the first cooking mode, the cooking oil contained in the oil bath is in a prescribed first oil amount, the object to be cooked is in a prescribed first rated amount, and the heater is set to a prescribed first heat quantity. In the second cooking mode, the cooking oil contained in the oil bath is in a prescribed second oil amount larger than the first oil amount, the object to be cooked is in a prescribed second rated amount larger than the first rated amount, and the heater is set to a prescribed second heat quantity larger than the first heat quantity.

The fryer according to still another aspect of the present invention includes a gas burner and an electric heater as the heater. In the fryer, the controller operates the gas burner only in the first cooking mode while the controller operates both of the gas burner and the electric heater in the second cooking mode.

"The gas burner" described herein includes a heater (a pulse burner (pulse combustor)) to heat an object with heat of combustion and exhaustion by intermittently burning fuel gas and combustion air in a combustion chamber as well as a heater to heat an object with a flame generated by combustion of the fuel gas and the combustion air.

According to the present invention, the stain of the cooking oil is suppressed and a span for exchanging the cooking oil can be made longer by cooking the object to be cooked in the first rated amount with a small amount of cooking oil, and lowering in the temperature of the cooking oil due to the cooking can be prevented during the busiest periods since the object to be cooked in the second rated amount is cooked with a large amount of cooking oil at a relatively high calorific heating value. Accordingly, even if the object to be cooked in the second rated amount is continuously cooked, the object to be cooked can be smoothly provided without degrading the cooking quality. That is, cooking a large amount of food materials can be realized even during the busiest periods such as the lunchtime while maintaining an advantage in cooking with a small amount of cooking oil (keeping the cooking oil well for a long period).

Especially, according to still another aspect of the present invention, in addition to the above-mentioned effect, the controller operates both of the gas burner and the electric heater in the second cooking mode. Therefore, even if the temperature of the cooking oil becomes lower when a large amount of objects to be cooked are put into the oil bath, a prescribed cooking temperature can be reached quickly.

DETAILED DESCRIPTION

Hereafter, a fryer according to an embodiment of the present invention will be described with reference to the drawings.

Figure 1:
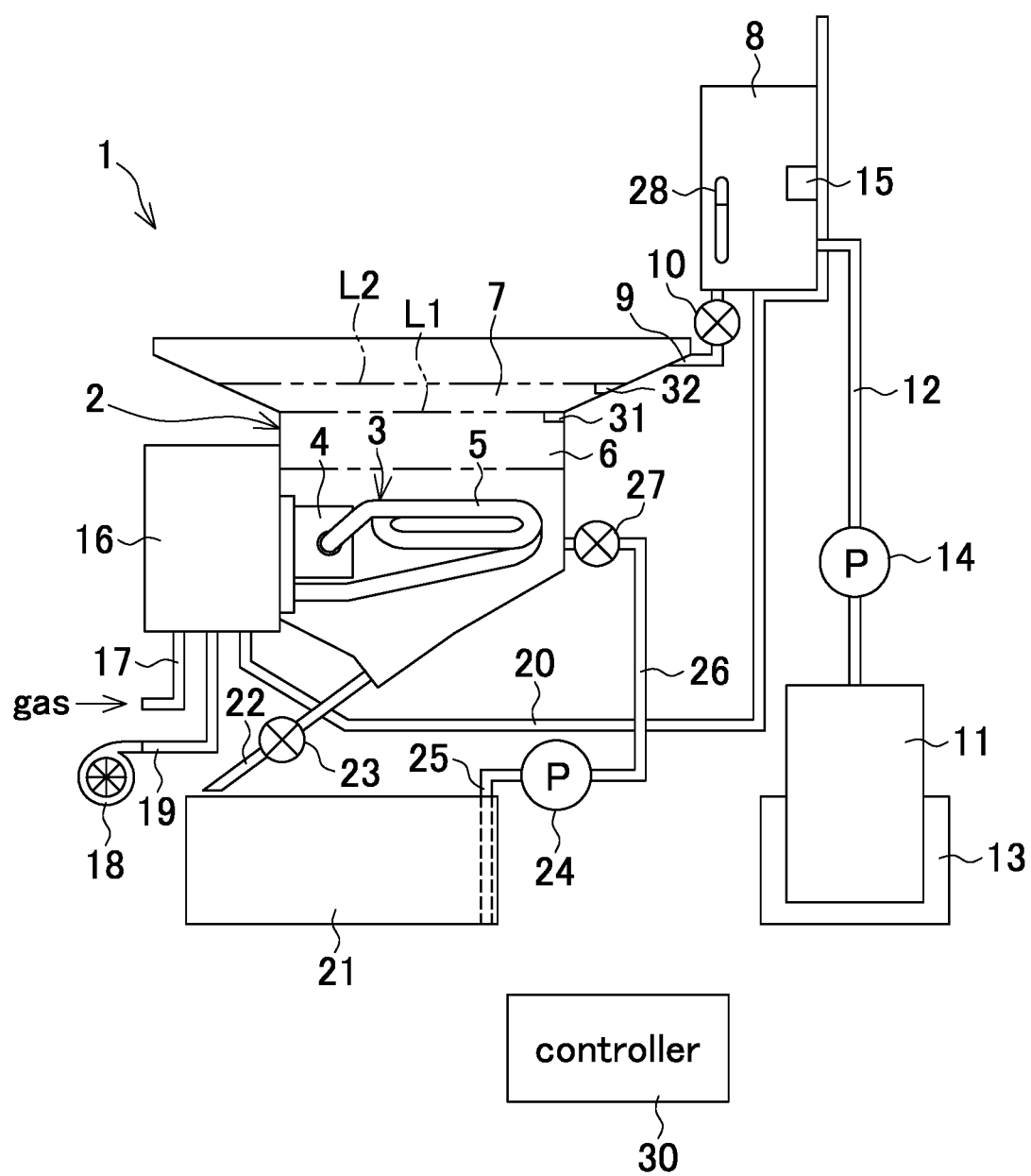
FIG. 1 is a schematic diagram of a fryer.

FIG. 1 is a schematic diagram illustrating one example of the fryer. This fryer 1 includes an oil bath 2 at an upper part of a fryer body (not shown). A pulse combustor 3 is provided at a bottom part in the oil bath 2 as a heater including a combustion chamber 4 and a tail pipe 5.

The oil bath 2 includes a first cooking part 6 formed into a deep bottom shape and provided with the pulse combustor 3 at the bottom part of the oil bath 2, and a second cooking part 7 positioned on the upper side of the first cooking part 6. The first cooking part 6 has a square cylindrical shape wherein an opening area is not changed vertically. The second cooking part 7 is formed into a reverse tapered shape longitudinally and laterally expanding from an upper end of the first cooking part 6 toward the upper side.

Further, an oil tank 8 containing cooking oil is provided on the rear side of the oil bath 2 and at an upper part of a fryer body. The oil tank 8 is for refilling the cooking oil stored in the oil bath 2, and is provided with a delivery tube 9 to supply oil inside the oil tank 8 to the oil bath 2. The delivery tube 9 can be opened and closed by an oil refilling valve 10 serving as an electromagnetic valve.

The oil tank 8 is connected to an oil container 11 such as an eighteen liter drum etc. provided at a lower part of the fryer body via a supply pipe 12. The oil container 11 contains solid oil, and the solid oil inside the oil container 11 can be melted with an electric heater 13 provided on the outside including a bottom part of the oil container 11. The melted cooking oil can be supplied to the oil tank 8 with an oil supply pump 14 provided in the supply pipe 12. Further, an oil level sensor 15 for detecting a position of an oil level is provided inside the oil tank 8. At least an oil amount corresponding to a difference between the first cooking part 6 and the second cooking part 7 of the oil bath 2 can be stored in the oil tank 8. An observation window 28 that allows visually confirming a residual amount of the cooking oil is provided in the oil tank 8.

An air chamber 16 is provided on a front-side outside of the oil bath 2, and a gas conduit 17 is connected to a mixing chamber that is provided inside the air chamber 16 and communicates with a combustion chamber 4 to supply fuel gas. Further, an air supply pipe 19 connected to a fan 18 provided on a bottom surface of the fryer body is connected to the mixing chamber to supply combustion air.

The tail pipe 5 of the pulse combustor 3 is arranged in a meandering state at a lower part of the oil bath 2, and then the tail pipe 5 is connected to an exhaust pipe 20 drawn out of the air chamber 16. The exhaust pipe 20 is arranged to be brought into contact with the oil tank 8 in a meandering state or winding state on the rear side of the fryer body, and then the exhaust pipe 20 protrudes upward so that combustion exhaust gas can be exhausted.

A filtering tank 21 with a filter at a bottom part is provided at a bottom part of the fryer body, and the cooking oil inside the oil bath 2 can be discharged from an oil discharge pipe 22 connected to the bottom part of the oil bath 2 to the filtering tank 21. The oil discharge pipe 22 is provided with a manually operated oil discharge valve 23.

Further, a filtering pump 24 is provided at the lower part of the fryer body. A suction side of the filtering pump 24 is connected to the bottom part of the filtering tank 21 via a suction pipe 25, and a discharge side of the filtering pump 24 is connected to a lower rear surface of the oil bath 2 via an oil supply pipe 26. An oil supply valve 27 serving as an electromagnetic valve is provided in the oil supply pipe 26.

A controller 30 as a control means is provided at a front lower part of the fryer body. The controller 30 monitors a temperature of the cooking oil detected from a temperature control thermistor 31 provided inside the oil bath 2 and performs ON/OFF control of the pulse combustor 3 in accordance with a menu selected with an operation panel (not shown) provided on a front surface of the fryer body to cook an object to be cooked such as potatoes etc. This cooking is described based on a flowchart in FIG. 2.

An amount of an object to be cooked at one time has two kinds of amounts, i.e. a first rated amount (for example, 680 g) and a second rated amount (for example, 900 g) larger than the first rated amount. Firstly, when an object to be cooked in the first rated amount is cooked, the oil bath 2 stores the cooking oil (about 35 lb) up to the upper end of the first cooking part 6 (L1 illustrated in FIG. 1). When an operation switch of the operation panel is turned on in this state in Si, the controller 30 rotates the fan 18 for a prescribed period of time to supply outside air, and then mixed gas is intermittently burned inside the combustion chamber 4 to operate the pulse combustor 3. That is, the mixed gas is ignited by an ignition plug provided inside the combustion chamber 4 to be explosively burned inside the combustion chamber 4 and combustion exhaust air is forcibly exhausted to the tail pipe 5 due to pressure increase inside the combustion chamber 4 following the burning. Meanwhile, the fuel gas and the combustion air are sucked into the combustion chamber 4 having a negative pressure due to the exhaustion of the combustion exhaust air. The operation of forcibly exhausting the combustion exhaust air and sucking the fuel gas and the combustion air (ON/OFF operation) is repeated to heat the cooking oil stored in the oil bath 2.

Next, the controller 30 monitors the detection temperature obtained from the temperature control thermistor 31, and a display that cooking can be started ("cooking OK") is output on the operation panel as information for a cook after confirming that the temperature of the cooking oil has reached the prescribed cooking temperature (for example, 180-182° C.) in S3.

When this information is given to the cook, the cook puts a basket including an object to be cooked into the oil bath 2. At this time, since a small amount of the object to be cooked of the first rated amount is put into the first cooking part 6, the object to be cooked is entirely immersed in the cooking oil, which is below an oil level of the first cooking part 6.

In S4, a cooking mode according to the operation of the operation panel is discriminated. When a first cooking mode is selected and a cooking start button provided on the operation panel is pushed in S5, the controller 30 heats and cooks the object to be cooked with a first heat quantity of the pulse combustor 3 and a first cooking time preset corresponding to the first rated amount in S6. When the time is up in S7, cooking completion is informed by sounding an alarm in S8. The cook pulls the basket out of the oil bath 2. When cooking is continuously performed in the first rated amount, S5 and the following processes are repeated by putting the object to be cooked into the oil bath 2 and pushing the cooking start button.

When the object to be cooked in the second rated amount larger than the first rated amount is put into the oil bath 2 in a state where the first cooking mode is selected, the object to be cooked is exposed from the oil level of a small amount of the first oil amount stored in the first cooking part 6. Accordingly, the operator can immediately grasp that the amount of the object to be cooked put into the oil bath 2 is a wrong, and then cooking can be restarted after correction.

When the object to be cooked in the second rated amount is cooked, it is necessary to store the cooking oil (about 45 lb) up to an upper end of the second cooking part 7 in the oil bath 2. At this time, when the second cooking mode is selected in S4, the controller 30 opens the oil refilling valve 10 in S9, and then the cooking oil inside the oil tank 8 is supplied to the oil bath 2 via the delivery tube 9 to feed the cooking oil up to the upper end of the second cooking part 7 (L2 illustrated in FIG. 1). It can be confirmed whether the oil amount reaches the second cooking part 7 by an oil level thermistor 32 provided inside the oil bath 2.

Next, the controller 30 monitors the detection temperature obtained from the temperature control thermistor 31, and a display that cooking can be started ("cooking OK") is output on the operation panel as information for the cook after confirming that the temperature of the cooking oil reached the prescribed cooking temperature (for example, 180-182° C.) in S10.

When this information is given to the cook, the cook puts the basket including the object to be cooked into the oil bath 2. At this time, since the object to be cooked in the second rated amount is put into the second cooking part 7 having a larger oil amount, the object to be cooked is entirely immersed below an oil level of the second cooking part 7. Since the second cooking part 7 is expanded into the reverse tapered shape even if the oil amount is large, hardly feeling that the level of the oil surface rises.

When the cooking start button is pushed in S11, the controller 30 heats and cooks the object to be cooked with a second heat quantity of the pulse combustor 3 and a second cooking time preset corresponding to the second rated amount in S12. The second heat quantity is larger than the first heat quantity in the first cooking mode. When the time is up in S13, cooking completion is informed by sounding an alarm in S14. The cook pulls the basket out of the oil bath 2. When cooking is continuously performed in the second rated amount, S11 and the following processes are repeated by putting the object to be cooked into the oil bath and pushing the cooking start button.

The controller 30 monitors a position of the oil level inside the oil tank 8 with the oil level sensor 15 during operation. When the oil level inside the oil tank 8 is below the prescribed position by refilling the oil bath 2 with the cooking oil, the solid oil inside the oil container 11 is melted by operating the electric heater 13, and the melted cooking oil inside the oil container 11 is supplied to the oil tank 8 by operating the oil supply pump 14. At this time, when after the oil supply pump 14 is operated, a detection signal at a prescribed position cannot be obtained from the oil level sensor 15 even after a lapse of prescribed time, the controller 30 determines that the solid oil inside the oil container 11 runs out and stops the oil supply pump 14 to give the cook this information.

When the second cooking mode is shifted to the first cooking mode having a small cooking amount, a pipe to a spare tank (not shown) may be connected to the oil discharge valve 23, and the cooking oil inside the oil bath 2 may be discharged to the spare tank until the oil level lowers to the upper end of the first cooking part 6 by operating the oil discharge valve 23 serving as a three-way valve. Alternatively, the cooking oil inside the oil bath 2 may be discharged to not the spare tank but the filtering tank 21.

Further, when the cooking oil in the oil bath 2 is filtered, the cooking oil inside the oil bath 2 is discharged to the filtering tank 21 by operating the oil discharge valve 23 after the operation switch is turned off. When a filtering switch of the operation panel is operated, the filtering pump 24 starts operating and sucks the cooking oil discharged to the filtering tank 21 from the suction pipe 25 to return to the oil bath 2 via the oil supply pipe 26. Thus, the cooking oil can be filtered with a filter provided on the bottom surface of the filtering tank 21.

As described above, according to the above-mentioned fryer 1, the controller 30 can perform the first cooking mode wherein an object to be cooked is cooked by controlling the pulse combustor 3 with the prescribed first heat quantity when the cooking oil contained in the oil bath 2 is in the prescribed first oil amount and the object to be cooked is in the prescribed first rated amount, and the second cooking mode wherein an object to be cooked is cooked by controlling the pulse combustor 3 with the prescribed second heat quantity larger than the first heat quantity when the cooking oil is in the prescribed second oil amount larger than the first oil amount and the object to be cooked is in the prescribed second rated amount larger than the first rated amount. Accordingly, the stain of the cooking oil is suppressed and the span for exchanging the cooking oil can be made longer by cooking the object to be cooked in the first rated amount with the small amount of cooking oil. Meanwhile, lowering in the temperature of the cooking oil due to the cooking can be prevented since the object to be cooked in the second rated amount is cooked with the large amount of cooking oil at the relatively high calorific heating value during the busiest periods. Thus, even if the object to be cooked in the second rated amount is continuously cooked, the object to be cooked can be smoothly provided without degrading the cooking quality. That is, cooking a large amount of food materials can be realized even during the busiest periods such as the lunchtime while maintaining the advantage in cooking with the small amount of cooking oil (keeping the cooking oil well for a long period).

In the above-mentioned embodiment, the controller automatically refills the oil bath with the cooking oil to cook with the second heat quantity and the second cooking time when the cook shifts the first cooking mode to the second cooking mode on the operation panel. However, the cooking oil can be refilled manually. That is, the oil refilling valve is manually operated to refill the second cooking part with the cooking oil, and then cooking may be performed with the second heat quantity for the second cooking time set by selecting the second cooking mode.

In contrast, the oil refilling valve and the oil discharge valve may be changed to electric-powered valves for the shifting operation of the modes to be fully automatic. In such a fully automatic operation, the controller automatically operates the oil refilling valve to execute the second cooking mode when the first cooking mode is shifted to the second cooking mode while the controller automatically operates the oil discharge valve and discharges the cooking oil in the second cooking part to execute the first cooking mode when the second cooking mode is shifted to the first cooking mode.

Alternatively, the first cooking mode and the second cooking mode may be executed fully manually. That is, while the cooking oil is in the first oil amount by manual operation of the oil discharge valve to cook an object to be cooked with the first heat quantity of the pulse combustor when the object in the first rated amount is cooked, the cooking oil is in the second oil amount by manual operation of the oil refilling valve etc. to cook an object to be cooked with the second heat quantity of the pulse combustor when the object in the second rated amount is cooked.

Further, since the oil tank and a refilling means using the oil tank are not always necessary in the invention according to the two cooking modes, the cooking oil may be refilled up to the second cooking part from the outside eighteen liter drum etc. when the second cooking mode is executed manually. In order to increase heat quantity in the second cooking mode, auxiliary heat sources such as the electric heater and the gas burner etc. may be employed other than increase in the heat quantity of the pulse combustor. When the second cooking mode is shifted to the first cooking mode, the heat quantity can be gradually decreased, for example, decreasing the heat quantity depending on temperature change of the cooking oil.

As another heater, the gas burner and the electric heater other than the pulse combustor can be employed, and the second cooking part in the oil bath is not limited to the reverse tapered shape, which can be appropriately changed.

According to the above-mentioned fryer 1, the fryer 1 includes the oil container 11 containing the solid oil, a heater for solid oil (the electric heater 13) to heat the solid oil inside the oil container 11, and an oil refilling means to supply the cooking oil inside the oil container 11 liquefied by heating to the oil bath 2. In the fryer, the oil refilling means includes the oil tank 8 provided above the oil bath 2, a supply path (the supply pipe 12) to supply the cooking oil inside the oil container 11 to the oil tank 8 with the oil supply pump 14 by connecting the oil container 11 to the oil tank 8, a delivery path (the delivery tube 9) to supply the cooking oil inside the oil tank 8 to the oil bath 2 by connecting the oil tank 8 to the oil bath 2, and an opening/closing means (the oil refilling valve 10) to open and close the delivery path. In the above configuration, a substantial amount of solid oil can be stored in a liquefied state in the oil tank 8 provided above the oil bath 2. Accordingly, it is possible to cope with volume reduction in the cooking oil in the oil bath 2 immediately, and cooking can be performed without hindrance by transferring the cooking oil from the oil container 11 into the oil tank 8 at a timing when the amount of the cooking oil contained in the oil tank 8 remains to some extent. As a result, since there is no need to always operate the electric heater 13, the running cost can be reduced. In addition, deterioration in the cooking oil due to heating with the electric heater 13 can also be suppressed.

Especially, since the oil tank 8 is provided with a visual confirmation part (the observation window 28) in which a storing state of the cooking oil can be visually confirmed, the cook can notice that the cooking oil inside the oil tank 8 runs out. Accordingly, the oil tank 8 can be refilled with the cooking oil at an appropriate timing, and thus delay in refilling the tank 8 with the cooking oil hardly hinders cooking.

Further, since exhaust heat from the pulse combustor 3 is transmitted to the oil tank 8, liquefaction of the cooking oil inside the oil tank 8 can be maintained by effectively utilizing the exhaust heat.

Furthermore, a detection means (the oil level sensor 15) to detect the storing state of the cooking oil is provided inside the oil tank 8. The controller 30 confirms that the cooking oil inside the oil tank 8 is a prescribed amount or less with the oil level sensor 15, and then the oil tank 8 is appropriately refilled with the cooking oil by operating the electric heater 13 and the oil supply pump 14.

In addition, when after the oil supply pump 14 is operated, the cooking oil inside the oil tank 8 does not exceed the prescribed amount even after a lapse of prescribed time, the controller 30 informs the cook that the oil container 11 becomes empty, and thus the cook can refill the oil container 11 with the solid oil quickly.

The controller 30 can perform the first cooking mode wherein an object to be cooked is cooked by controlling the pulse combustor 3 with the prescribed first heat quantity when the cooking oil contained in the oil bath 2 is in the prescribed first oil amount and the object to be cooked is in the prescribed first rated amount. Further, the controller 30 can perform the second cooking mode wherein an object to be cooked is cooked by controlling the pulse combustor 3 with the prescribed second heat quantity larger than the first heat quantity when the cooking oil is in the prescribed second oil amount larger than the first oil amount and the object to be cooked is in the prescribed second rated amount larger than the first rated amount. The oil tank 8 can store the cooking oil of at least the difference between the cooking oil necessary for the object to be cooked in the first rated amount and the cooking oil necessary for the object to be cooked in the second rated amount. Accordingly, since the cooking oil put into the oil bath 2 can be refilled from the oil tank 8 when the first cooking mode is shifted to the second cooking mode, the first cooking mode can be shifted to the second cooking mode immediately.

In the invention according to the oil refilling means, the pump to supply the cooking oil from the oil container to the oil tank may be operated manually at an arbitrary timing, or the oil refilling valve may be opened/closed automatically/manually. The oil tank may be removable.

Further, not only the observation window but also a water gauge etc. can be employed as the visual confirmation part.

In addition, when there is a plurality of oil baths, the cooking oil may be refilled from one oil tank to each of the oil baths, or each of the oil baths may be provided with one oil tank. The oil container may be provided not only for each oil tank but also for the plurality of oil tanks. Structure of the filtering can be omitted.

According to the above-mentioned fryer 1, the oil bath 2 includes the first cooking part 6 formed into the deep bottom shape to store the first oil amount and the second cooking part 7 formed on the upper side of the first cooking part 6 to store the second oil amount, and the second cooking part 7 is formed into the reverse tapered shape expanding in a circumferential direction from the upper end of the first cooking part 6 toward the upper side. Therefore, the volume when the first cooking mode is shifted to the second cooking mode can be ensured without increasing the volume of the oil bath 2 so much. Accordingly, it is possible to suppress the increase in size of the oil bath 2 for cost reduction even if cooking can be performed in both of the first cooking mode and the second cooking mode. In addition, the cookability and the maintainability are not impaired.

When the object to be cooked in the first rated amount is put into the oil bath in a state where the cooking oil in the first oil amount is stored in the first cooking part 6, the object to be cooked is entirely immersed in the cooking oil while when the object to be cooked in the second rated amount is put into the oil bath, the object to be cooked is exposed above the oil level of the cooking oil. Accordingly, the cook can obtain information that the object to be cooked in a wrong amount is put into the oil bath, thereby minimizing cooking time loss.

In the invention related to the shape of the oil bath, structures of the oil tank, the oil container, and the filtering are not always necessary, and structure of the fryer is not limited to the above-mentioned configuration if the first and second cooking modes having different rated amounts of the object to be cooked can be performed in one oil bath.

Figure 3:
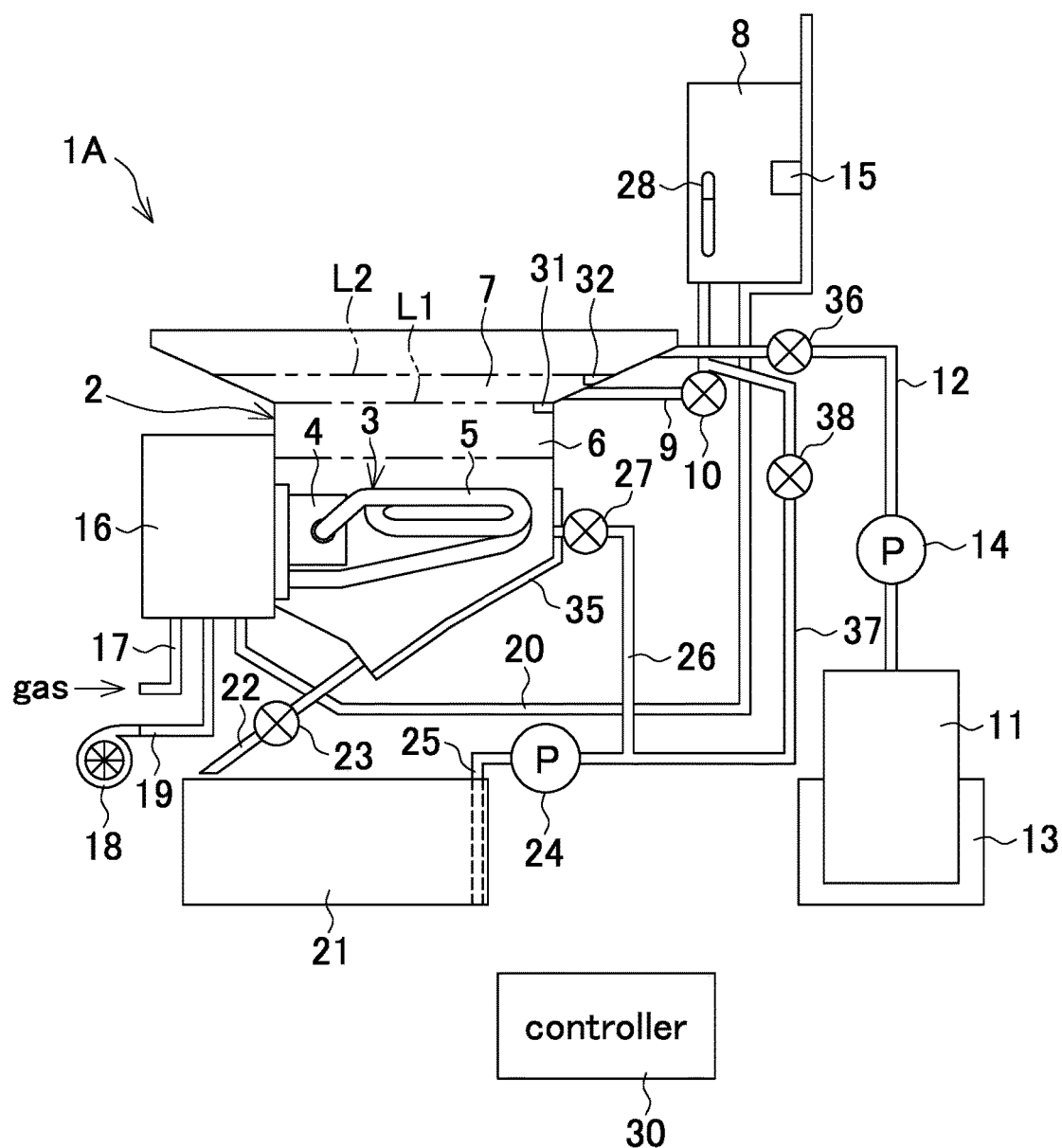
FIG. 3 is a schematic diagram of a variation of the fryer.

FIG. 3 illustrates a variation of the invention according to the two cooking modes, and a fryer 1A includes an electric heater 35 as an auxiliary electric source in addition to the pulse combustor (gas burner) 3 as a heater. Although the electric heater 35 is provided, for example, from the bottom surface of the oil bath 2 to a side surface thereof outside the oil bath 2, the electric heater 35 may be provided over the entire surface of each surface, or a plurality of heaters may be provided with a prescribed space.

In the fryer 1A, the delivery tube 9 is connected between the upper end of the first cooking part 6 and the upper end of the second cooking part 7, and the supply pipe 12 from the oil container 11 is connected to not the oil tank 8 but a position on an upper side of the second cooking part 7 in the oil bath 2. The supply pipe 12 is provided with an oil adding valve 36, and the cooking oil melted inside the oil container 11 can be directly supplied to the oil bath 2 by opening the oil adding valve 36 and operating the oil supply pump 14.

Further, the oil supply pipe 26 from the filtering tank 21 to the oil bath 2 branches from a downstream side of the filtering pump 24, and a branched second oil supply pipe 37 is connected to an upstream side of the oil refilling valve 10 in the delivery tube 9. The second oil supply pipe 37 is provided with a second oil supply valve 38.

Figure 2:
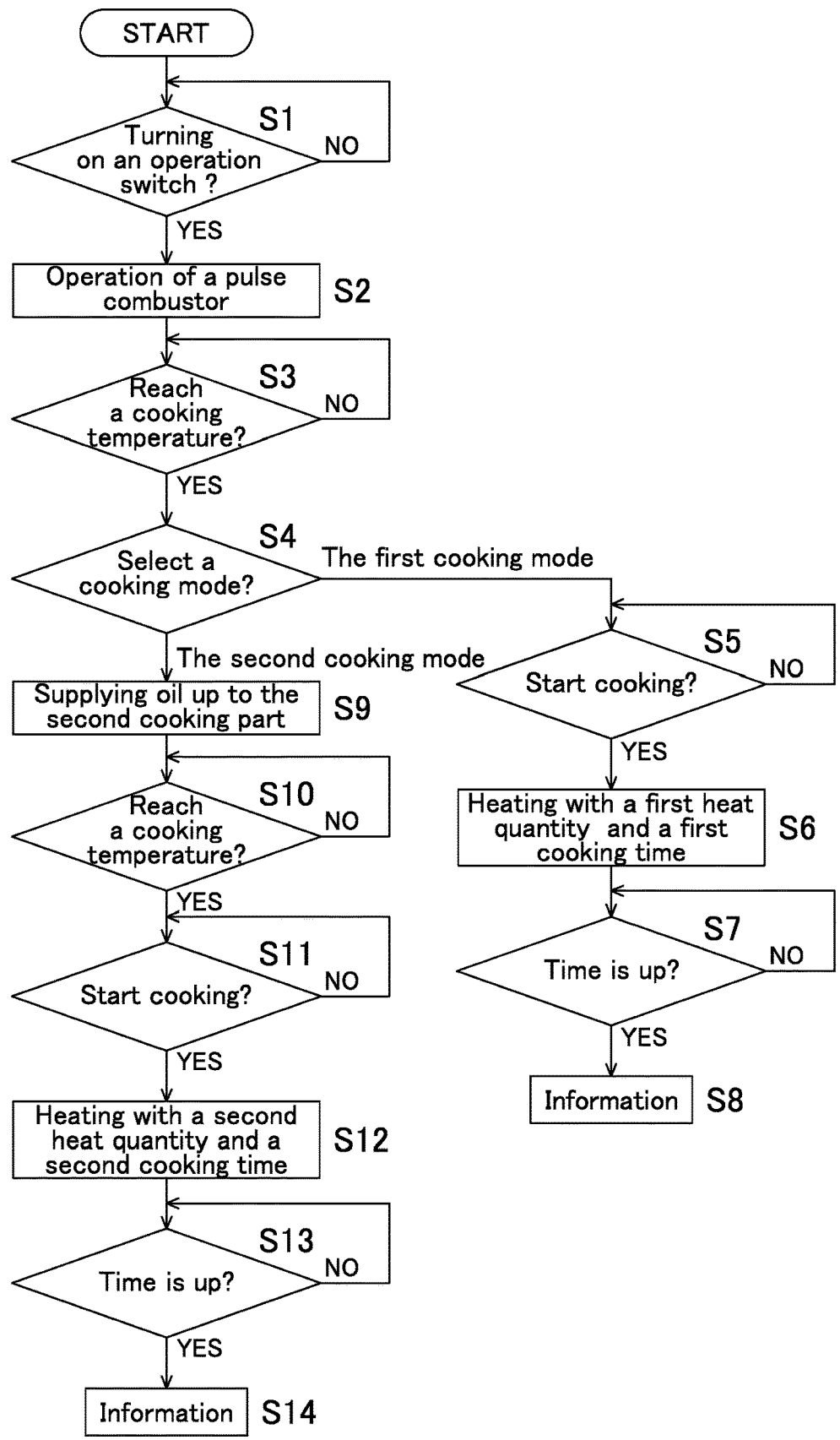
FIG. 2 is a flowchart of a cooking mode by a controller.
Figure 4:
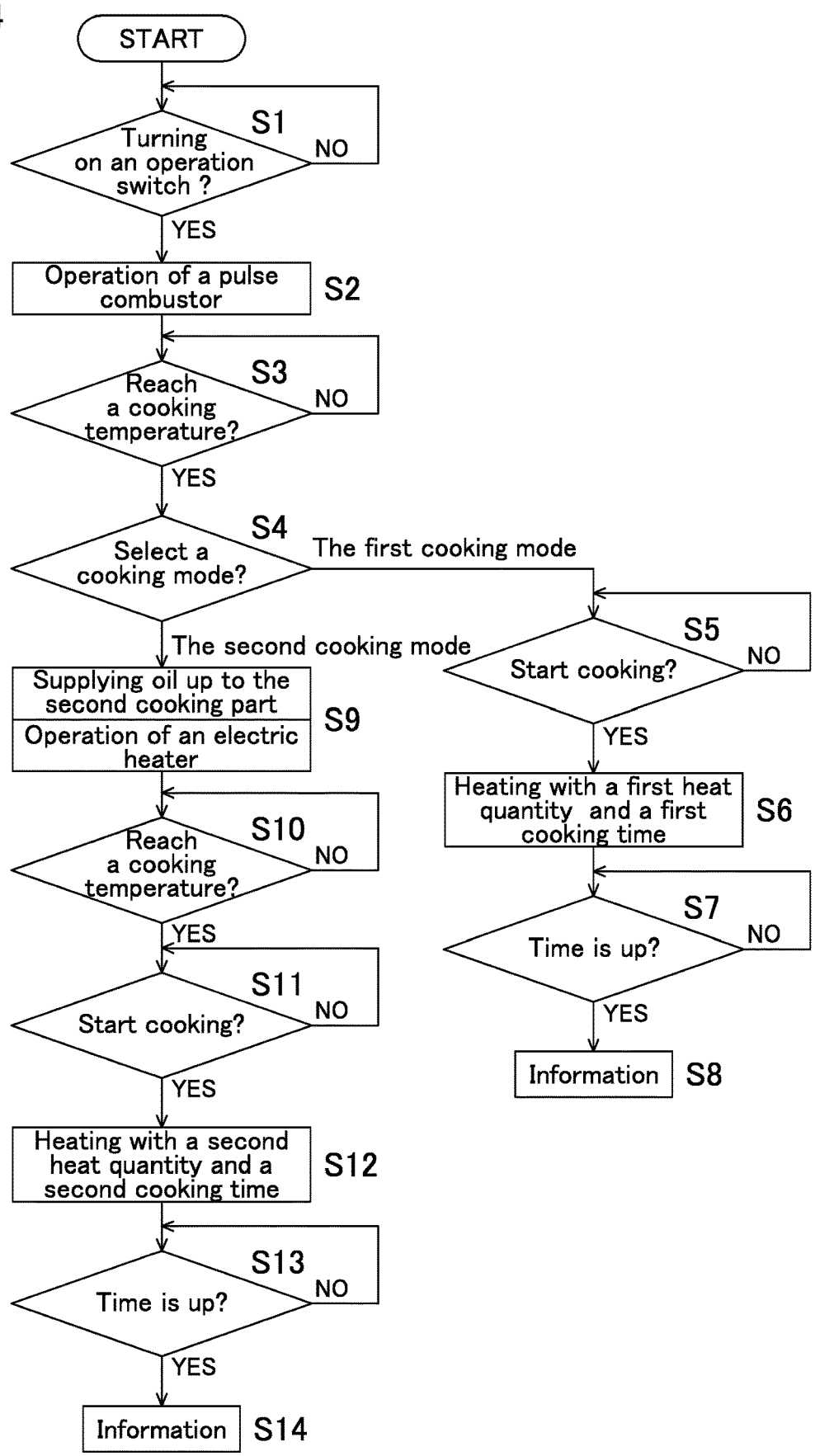
FIG. 4 is a flowchart of a cooking mode in the variation of the fryer.

In the fryer 1A, the controller 30 executes each of the cooking modes based on a flowchart almost the same as FIG. 2 as illustrated in FIG. 4. However, FIG. 2 and FIG. 4 are different from each other. In the control of FIG. 2, heat cooking is performed with the second heat quantity by operating the pulse combustor 3 only in the second cooking mode. In the control of FIG. 4, oil is supplied up to the upper end of the second cooking part 7 by manually or automatically opening the oil refilling valve 10 in S9, and the electric heater 35 is operated to perform the heat cooking with the second heat quantity along with the pulse combustor 3 in the second cooking mode.

In addition, in the fryer 1A, the controller 30 monitors the position of the oil level (temperature at the oil level) with the temperature control thermistor 31 or the oil level thermistor 32 in both of the first cooking mode and the second cooking mode. When the oil is below the oil level set in each of the cooking modes, the oil adding valve 36 is opened to operate the oil supply pump 14, and the cooking oil in the fixed amount melted inside the oil container 11 is automatically supplied to the oil bath 2. The controller 30 monitors the residual amount of the oil by measuring a weight etc. of the oil container 11, and information that the residual amount reaches a certain value is given to the cook from the operation panel.

In filtering of the cooking oil, when the filtering pump 24 is operated, both of the oil supply valve 27 and the second oil supply valve 38 are opened, and the filtered cooking oil is returned to the oil tank 8 via the second oil supply pipe 37 while returned to the oil bath 2 via the oil supply valve 26.

As described above, also in the fryer 1A related to the variation, the stain of the cooking oil is suppressed and the span for exchanging the cooking oil can be made longer by cooking the object to be cooked in the first rated amount with a small amount of cooking oil. Meanwhile, lowering in the temperature of the cooking oil due to the cooking can be prevented since the object to be cooked in the second rated amount is cooked with the large amount of cooking oil at the relatively high calorific heating value during the busiest periods. Accordingly, even if the object to be cooked in the second rated amount is continuously cooked, and the object to be cooked can be smoothly provided without degrading the cooking quality.

Since both of the pulse combustor 3 and the electric heater 35 are operated in the second cooking mode, even if the temperature of the cooking oil becomes lower when the large amount of objects to be cooked are put into the oil bath, a prescribed cooking temperature can be reached quickly.

In this variation, the gas burner is not limited to the pulse combustor (pulse burner), and the gas burner provided on a lower side of the oil bath to heat the oil bath with a flame generated by combustion of air-fuel mixture can be also employed.

As in the case with the former embodiment of the fryer, the cooking oil may be refilled from the oil container in the second cooking mode without the oil tank. In this case, the second oil supply pipe and the second oil supply valve are removed, and the filtered cooking oil can be returned to the oil bath only.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:
1. A fryer comprising:
    an oil bath containing cooking oil;
    a heater provided in the oil bath to heat the cooking oil;
    a controller to control the heater;
    an oil tank located above the oil bath and containing cooking oil for refilling the cooking oil in the oil bath via at least one delivery tube; and
    a filtering tank with a filter;
    wherein:
        the controller performs a first cooking mode in which an object to be cooked is cooked by controlling the heater with a prescribed first heat quantity when the cooking oil contained in the oil bath is in a prescribed first oil amount, and the object to be cooked is in a prescribed first rated amount; and
        a second cooking mode in which an object to be cooked is cooked by controlling the heater with a prescribed second heat quantity larger than the first heat quantity when the cooking oil is in a prescribed second oil amount larger than the first oil amount, and the object to be cooked is in a prescribed second rated amount larger than the first rated amount;

wherein the oil tank is configured to store an oil amount corresponding to a difference between the first oil amount and the second oil amount;

wherein, upon selecting the second cooking mode, an oil refilling valve is opened to supply additional cooking oil from the oil tank to the oil bath to fill the oil bath to the prescribed second oil amount;

wherein, upon shifting from the second cooking mode to the first cooking mode, the cooking oil inside the oil bath is discharged to the filtering tank until the prescribed first oil amount is reached in the oil bath; and wherein the cooking oil discharged to the filtering tank is filtered and the filtered cooking oil is returned to the oil tank via a supply pipe, so that necessary amount of the oil can be supplied to the oil bath when the second cooking mode is selected.

2. A fryer comprising:

an oil bath containing cooking oil;

a heater provided in the oil bath to heat the cooking oil;

a controller to control the heater;

an oil tank located above the oil bath and containing cooking oil for refilling the cooking oil in the oil bath via at least one delivery tube; and a filtering tank with a filter, wherein a first cooking mode and a second cooking mode are performed to cook an object to be cooked;

wherein:
    in the first cooking mode,
        the cooking oil contained in the oil bath is in a prescribed first oil amount;
        the object to be cooked is in a prescribed first rated amount; and
        the heater is set to a prescribed first heat quantity; and
    in the second cooking mode,
        the cooking oil contained in the oil bath is in a prescribed second oil amount larger than the first oil amount;
        the object to be cooked is in a prescribed second rated amount larger than the first rated amount; and
        the heater is set to a prescribed second heat quantity larger than the first heat quantity;

wherein the oil tank is configured to store an oil amount corresponding to a difference between the first oil amount and the second oil amount;

wherein, upon selecting the second cooking mode, an oil refilling valve is opened to supply additional cooking oil from the oil tank to the oil bath to fill the oil bath to the prescribed second oil amount;

wherein, upon shifting from the second cooking mode to the first cooking mode, the cooking oil inside the oil bath is discharged to the filtering tank until the prescribed first oil amount is reached in the oil bath; and wherein the cooking oil discharged to the filtering tank is filtered and the filtered cooking oil is returned to the oil tank via a supply pipe, so that necessary amount of the oil can be supplied to the oil bath when the second cooking mode is selected.

3. The fryer according to claim 1, comprising:

a gas burner and an electric heater comprising the heater, wherein the controller operates the gas burner only in the first cooking mode and the controller operates both of the gas burner and the electric heater in the second cooking mode.

4. The fryer according to claim 2, comprising:

a gas burner and an electric heater comprising the heater, wherein the controller operates the gas burner only in the first cooking mode and the controller operates both of the gas burner and the electric heater in the second cooking mode.

5. The fryer according to claim 1, wherein the cooking oil discharged to the filtering tank is filtered and the filtered cooking oil is returned to the oil bath via the supply pipe, when the second cooking mode is selected.

6. The fryer according to claim 2, wherein the cooking oil discharged to the filtering tank is filtered and the filtered cooking oil is returned to the oil bath via the supply pipe, when the second cooking mode is selected.

* * * * *